(12) United States Patent
Gaignet et al.

(10) Patent No.: US 8,414,767 B2
(45) Date of Patent: Apr. 9, 2013

(54) MODULE FOR PURIFYING A FLUID, IN PARTICULAR WATER

(75) Inventors: Yves Gaignet, Montigny le Bretonneux (FR); Denis Daulasim, Bois d'Arcy (FR); Jacques Moulin, Plaisir (FR)

(73) Assignee: EMD Millipore Corporation, Billerica, MA (US)

( * ) Notice: Subject to any disclaimer, the term of this patent is extended or adjusted under 35 U.S.C. 154(b) by 1148 days.

(21) Appl. No.: 10/666,017

(22) Filed: Sep. 18, 2003

(65) Prior Publication Data

US 2004/0104161 A1 Jun. 3, 2004

(30) Foreign Application Priority Data

Sep. 26, 2002 (FR) ...................................... 02 11913

(51) Int. Cl.
| | | |
|---|---|---|
| B01D 27/00 | (2006.01) | |
| B01D 29/00 | (2006.01) | |
| B01D 35/00 | (2006.01) | |
| B01D 35/30 | (2006.01) | |
| B01D 63/00 | (2006.01) | |
| B01D 36/02 | (2006.01) | |
| C02F 1/00 | (2006.01) | |
| C02F 9/00 | (2006.01) | |
| C02F 1/44 | (2006.01) | |

(52) U.S. Cl. ........ 210/256; 210/259; 210/314; 210/315; 210/316; 210/321.74; 210/323.2; 210/335; 210/337; 210/338; 210/339; 210/342

(58) Field of Classification Search ................. 210/263, 210/264, 282, 285, 286, 294, 295, 314, 315, 210/316, 317, 320, 321.6, 321.87, 437, 438, 210/440, 443, 338, 342

See application file for complete search history.

(56) References Cited

U.S. PATENT DOCUMENTS

| | | | | |
|---|---|---|---|---|
| 3,542,199 A | * | 11/1970 | Bray et al. ..................... | 210/116 |
| 4,645,601 A | * | 2/1987 | Regunathan et al. ..... | 210/321.83 |
| 4,877,521 A | | 10/1989 | Petrucci et al. ............... | 210/171 |
| 4,948,505 A | * | 8/1990 | Petrucci et al. ............... | 210/238 |
| 4,990,248 A | * | 2/1991 | Brown et al. ................. | 210/136 |
| 4,992,170 A | * | 2/1991 | Menon et al. ............. | 210/321.78 |
| 5,026,465 A | | 6/1991 | Katz et al. ..................... | 204/524 |
| 5,078,876 A | * | 1/1992 | Whittier et al. ............... | 210/315 |
| 5,221,473 A | * | 6/1993 | Burrows ....................... | 210/232 |
| 5,891,334 A | * | 4/1999 | Gundrum et al. ............. | 210/232 |

FOREIGN PATENT DOCUMENTS

| | | |
|---|---|---|
| EP | 0 422 453 | 4/1991 |
| EP | 1 069 079 | 1/2001 |
| EP | 1 233 004 | 8/2002 |

* cited by examiner

Primary Examiner — Benjamin Kurtz
(74) Attorney, Agent, or Firm — Nields, Lemack & Frame, LLC

(57) ABSTRACT

A fluid purifying module including a monolithic container, a pretreatment filter, and a selectively permeable membrane treatment cartridge, respectively housed in an external cylindrical space and an internal cylindrical space of the container, communicating with each other via one or more passages in the vicinity of one axial end of the container. The external space communicates at the same end as the opposite axial end with a first connector orifice for feeding fluid to be purified to the pretreatment filter, and the internal space communicates separately, at the same end as the aforementioned axial end, with a second connector orifice for evacuating from the module a flow of permeate (purified fluid) and with a third connector orifice for evacuating from the module a flow of retentate (residual fluid).

21 Claims, 7 Drawing Sheets

MODULE FOR PURIFYING A FLUID, IN PARTICULAR WATER

The present invention relates generally to modules for purifying a fluid and in particular to modules for purifying water.

The invention relates more particularly to the situation in which the module for purifying a fluid includes a cylindrical container having at a first of its axial ends fluid inlet and outlet orifices communicating with the interior of the module, in which are housed means for pretreating the fluid to be purified and means for treating the fluid treated by the pretreatment means.

In an arrangement already known in the art and described in U.S. Pat. No. 4,992,170, the pretreatment means, just like reverse osmosis treatment means, take the form of made to measure elements. In practice, the elements are replaceable to make the modules less expensive, at the cost of being somewhat difficult to use.

A general object of the present invention is an arrangement that avoids this drawback and has further advantages.

To be more precise, the present invention provides a module for purifying a fluid, in particular for purifying water, of the kind including a cylindrical container provided at a first of its axial ends with fluid inlet and outlet orifices communicating with the interior of the module, in which are housed pretreatment means for carrying out a first operation of purifying the fluid and treatment means for carrying out a second operation of purifying the fluid after the latter has been treated by the pretreatment means, which module is characterized in that the container is monolithic to form a disposable module and the interior thereof is divided by separator means into an external cylindrical space and an internal cylindrical space communicating with each other via one or more passages in the vicinity of the second axial end of the container, the pretreatment means are pretreatment means known in the art, the treatment means include a cartridge known in the art of the kind including one or more selectively permeable membranes for dividing, by virtue of permeation through the membrane or membranes due to the action of a pressure gradient, the flow of fluid that has undergone the first purification operation and caused to flow tangentially to the membrane or membranes into a flow of permeate consisting of purified fluid that has passed through the membrane and therefore undergone two purification operations and a flow of retentate consisting of residual fluid that has not passed through the membrane or membranes, the pretreatment means and the cartridge are housed in the external cylindrical space and the internal cylindrical space, respectively, the external cylindrical space communicates, at the same end as the first axial end of the container, with a first orifice for feeding fluid to be purified to the pretreatment means, and the internal cylindrical space communicates separately, at the same end as the first axial end of the container, with a second orifice for evacuating from the module the flow of permeate and with a third orifice for evacuating from the module the flow of retentate.

In other words, the invention exploits the availability of standard design off-the-shelf pretreatment and treatment means, in particular reverse osmosis, nanofiltration and ultrafiltration cartridges, which are therefore economical, to produce a disposable module which is for this very reason easier to use than prior art embodiments of this type.

For reasons of economy and convenient fabrication of the container and assembly of the module, the reverse osmosis cartridge used is preferably of the kind including (i) a cylindrical enclosure and, concentric therewith, a hollow, perforated, central tube, the central tube sharing the axis of the cylindrical container with the external cylindrical space and the internal cylindrical space, (ii) one or more selectively permeable reverse osmosis treatment membranes between the cylindrical enclosure and the central tube and communicating with the central tube for collection by the latter of the flow of permeate and with the exterior of the reverse osmosis cartridge via the annular faces thereof between the cylindrical enclosure and the central tube at each axial end of the cylindrical enclosure, respectively to feed the reverse osmosis cartridge with water treated by the pretreatment means and for the outflow of retentate.

In a preferred embodiment means for providing a sealed connection between the separator means and the cylindrical enclosure of the reverse osmosis cartridge are attached to the cylindrical enclosure and extend around the cylindrical enclosure.

The pretreatment means are generally chosen from the group comprising activated charcoal, polyphosphates and frontal filtration elements (the fluid to be treated is fed perpendicularly to the filter medium), such as porous disks, etc.

According to other features that are preferred for reasons of economy or convenience of fabrication, assembly or use:
  the container includes a cylindrical wall closed at the first axial end by a non-removable head for connecting the module to a fluid purification unit and including three parallel connectors in each of which is formed one of the three orifices and the cylindrical wall is closed at the second axial end by a non-removable bottom; and/or
  the connectors extend globally perpendicularly to the axis of the cylindrical wall of the container; and/or
  the separator means include a cylindrical wall, a cylindrical skirt, and a ring respectively projecting from the internal face of the head and the internal face of the bottom, the skirt and the ring providing continuity of separation from a corresponding longitudinal end of the cylindrical wall to the head and to the bottom, respectively; and/or
  the head is fixed to the cylindrical wall of the container by gluing, rotation welding, ultrasound welding or fusion welding their annular edges; and/or
  the cylindrical skirt of the head and the axial end of the cylindrical wall of the separator means at the same end as the first axial end of the container are either fixed together by gluing, rotation welding, ultrasound welding or fusion welding their annular edges or housed concentrically with one inside the other with a seal between them; and/or
  the skirt of the head and the cylindrical wall of the separator means each have an annular recess forming with the opposite recess an annular housing for the seal; and/or
  the ring of the bottom and the axial end of the cylindrical wall of the separator means at the same end as the second axial end of the container are housed concentrically one inside the other; and/or
  the ring of the bottom is crenellated to form a plurality of passages allowing the external cylindrical space and the internal cylindrical space to communicate with each other; and/or
  the bottom of the container includes locating means for holding the cylindrical wall of the separator means at an axial distance from the internal face of the bottom to allow fluid to flow from the external cylindrical space to the internal cylindrical space via the crenellations of the crenellated ring; and/or
  the crenellated ring includes recesses between the crenellations and forming axial abutments serving as locating means for the cylindrical wall of the separator means; and/or the locating means take the form of patterns projecting from the internal face of the bottom of the container; and/or the perimeter of the cylindrical wall of the separator means has in the vicinity of each axial end of the cylindrical wall centering fingers extending radially as far as the cylindrical wall of the container and serving to place the axis of the cylindrical wall on the axis of the container; and/or the head and the bottom of the container include nesting type retaining means for the cartridge; and/or the head and the bottom each include a bush housing a respective axial end portion of the central tube and one or more seals are disposed between the latter and the central bush of the head, the latter bush communicating with the second orifice; and/or the seal or each seal is housed in a groove formed in the central tube; and/or a central truncated cone for positioning the cartridge, operative inside the central tube of the latter, projects from the internal face of the bottom of the container, concentrically with the bush of the bottom and over a length greater than that of the bush; and/or there is a perforated or porous disk in the vicinity of each axial end of the container and between the cylindrical walls of the latter to retain the pretreatment means in the external cylindrical space whilst allowing the fluid to be purified to pass; and/or the central tube is closed at the same end as the annular face of the reverse osmosis cartridge through which the fluid enters the cartridge.

Features and advantages of the invention will emerge from the following description given by way of example with reference to the accompanying diagrammatic drawings in which.

Figure 1:
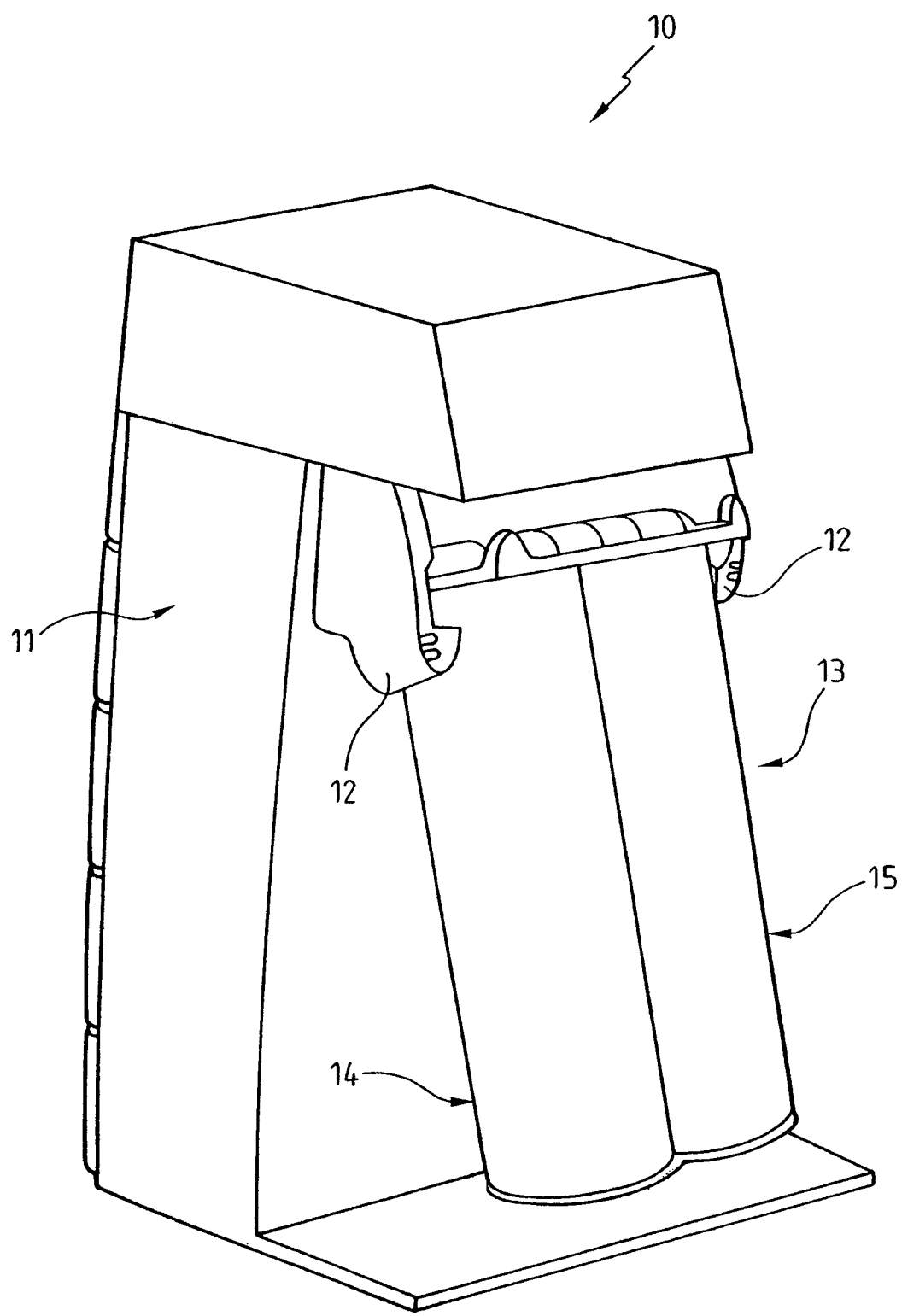
FIG. 1 is a perspective view of a purified water production unit equipped with two water treatment modules, one of which conforms to the invention.

The purified water production unit 10 shown in FIG. 1 includes an enclosure 11 with two projecting support arms 12 for removably mounting an assembly 13 of two purified water production modules 14 and 15 on the unit 10. Note that the modules 14 and 15 are shown more diagrammatically in FIG. 1 than in FIGS. 2 to 5.

As the unit 10 is not in itself relevant to the present invention, it is not described here.

Suffice to say that, in the embodiment shown, the unit 10 includes male connectors (not visible in the figures) for feeding water to the modules 14 and 15 and recovering water treated by the modules 14 and 15.

In practice, untreated water is fed by the unit 10 to the first module 14, which treats it, and the unit 10 recovers water treated in this way in order to feed it to the second module 15, which also treats it, but using different means from those used in the first module 14 (this is known as polishing).

As a result, purified water recovered by the unit 10 at the outlet of the second module 15 is in practice ultrapure.

It should also be noted that some accessories of the unit 10, such as the protective cap designed to cover the assembly 13, are not shown in FIG. 1 and that, in other embodiments, a purified water production unit using only the module 14 conforming to the invention and described in more detail with reference to FIGS. 3 to 5 can be used.

The means for removably mounting the assembly 13 of modules on the unit 10 are not in themselves relevant to the present invention either and are not described in detail here.

Suffice to say that, in the embodiment shown, each support arm 12 has a recess (not visible in the figures) in its internal face facing toward the internal face of the opposite support arm 12, by means of which are formed a heel-piece and a bearing surface for a lateral extension 16 of the module 14, 15 associated with the support arm 12.

Moreover, the heel-piece and the bearing surface of the support arm 12 define a dihedral angle and each lateral extension 16 has an opening 17 in which the heel-piece is intended to be nested and which is bordered by a bevel 18 having a configuration complementary to that of the dihedral angle with which it is intended to cooperate.

Clearly these arrangements facilitate mounting the assembly 13 comprising the modules 14 and 15 on the unit 10 and demounting them, which has the benefit of making the module more convenient to use.

This convenience is further improved by projections 19 on the head 20 of each of the modules 14, 15 which form bearing surfaces for the user's thumbs, while the support arms 12 are designed to receive the user's other fingers.

The user can therefore very easily tilt the assembly 13, after inserting the extensions 16 between the arms 12, to engage each bevel 18 in the associated dihedral angle to prevent movement of the assembly 13 in translation on the unit 10. Thanks to the arrangements previously cited, separation is also achieved by tilting the assembly 13.

Figure 2:
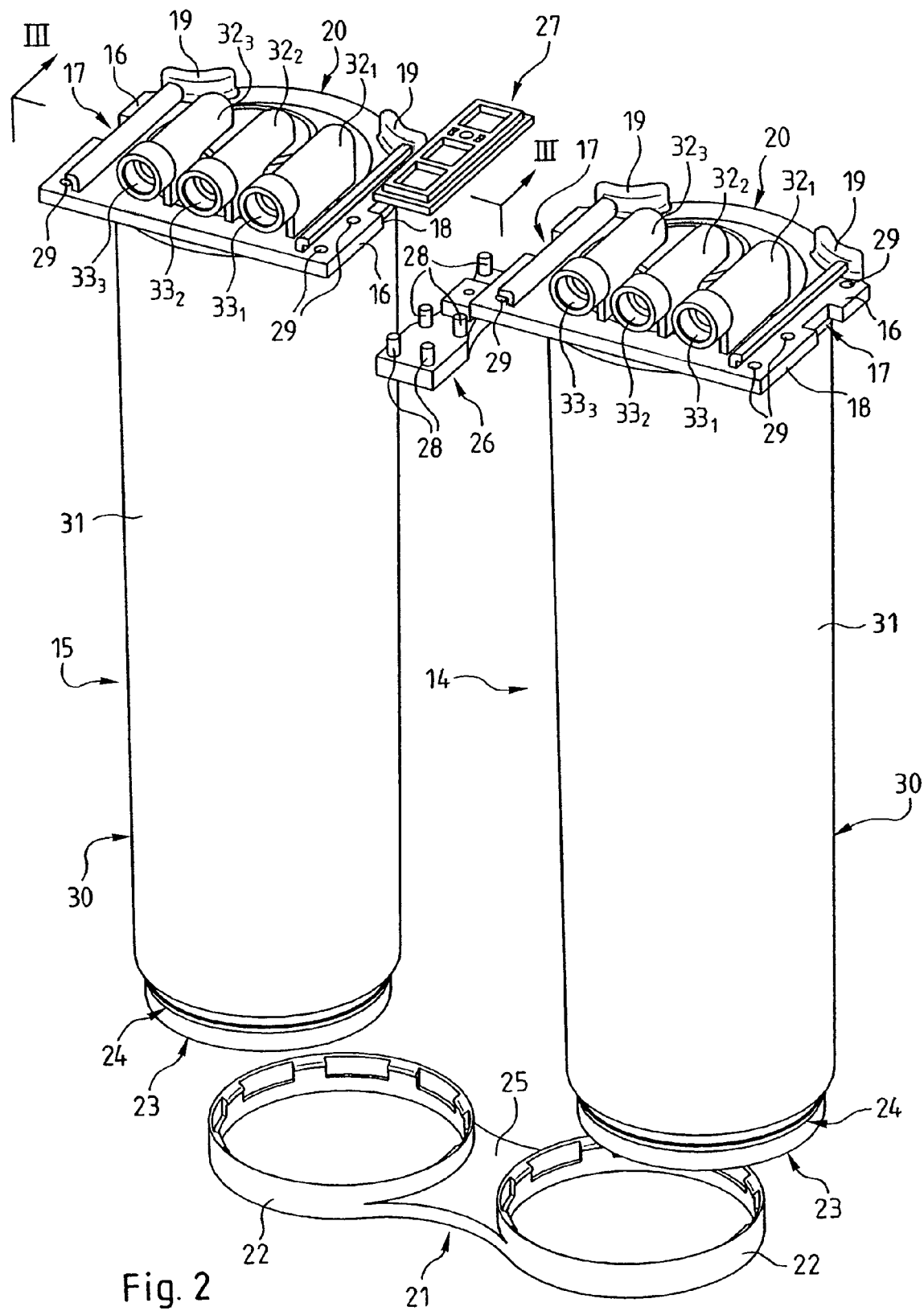
FIG. 2 is an exploded perspective view to a different scale of the assembly of two modules from FIG. 1.

As can be seen better in FIG. 2, the modules 14 and 15 are coupled by a base 21 with a figure-of-eight configuration comprising two rings 22 having an internal conformation for removably clipping them to the bottom 23 of one of the modules 14 and 15, each of which is provided for this purpose with a flange 24. The two rings 22 are joined by a bridge 25 molded in one piece with the rings 22 from a plastics material.

The modules 14 and 15 are also coupled together at the level of their head 20 by two connecting strips 26 and 27. The strip 26 carries studs 28 by which the modules 14 and 15 can be coupled side by side by means of holes 29 through their lateral extensions 16 adapted to receive the studs 28.

In the assembled state the ends of the studs 28 project beyond the holes 29 and fasten the strips 26 and 27 together by virtue of a tight fit of the studs 28 in blind holes in the strip 27 (these holes are not visible in FIG. 2).

In the embodiment shown in FIGS. 2 to 5, each purified water production module 14, 15 includes a container 30 with a cylindrical wall 31 closed at a first axial end by the head 20 for connecting the module 14, 15 to the water purification unit 10 and at its second axial end by the bottom 23.

In practice, the head 20 is permanently fixed to the cylindrical wall 31, here by a welding operation involving fusing their annular edges, and the bottom 23 is molded in one piece with the cylindrical wall 31 from a plastics material. This produces a monolithic container intended to form a disposable module 14, 15.

Figure 3:
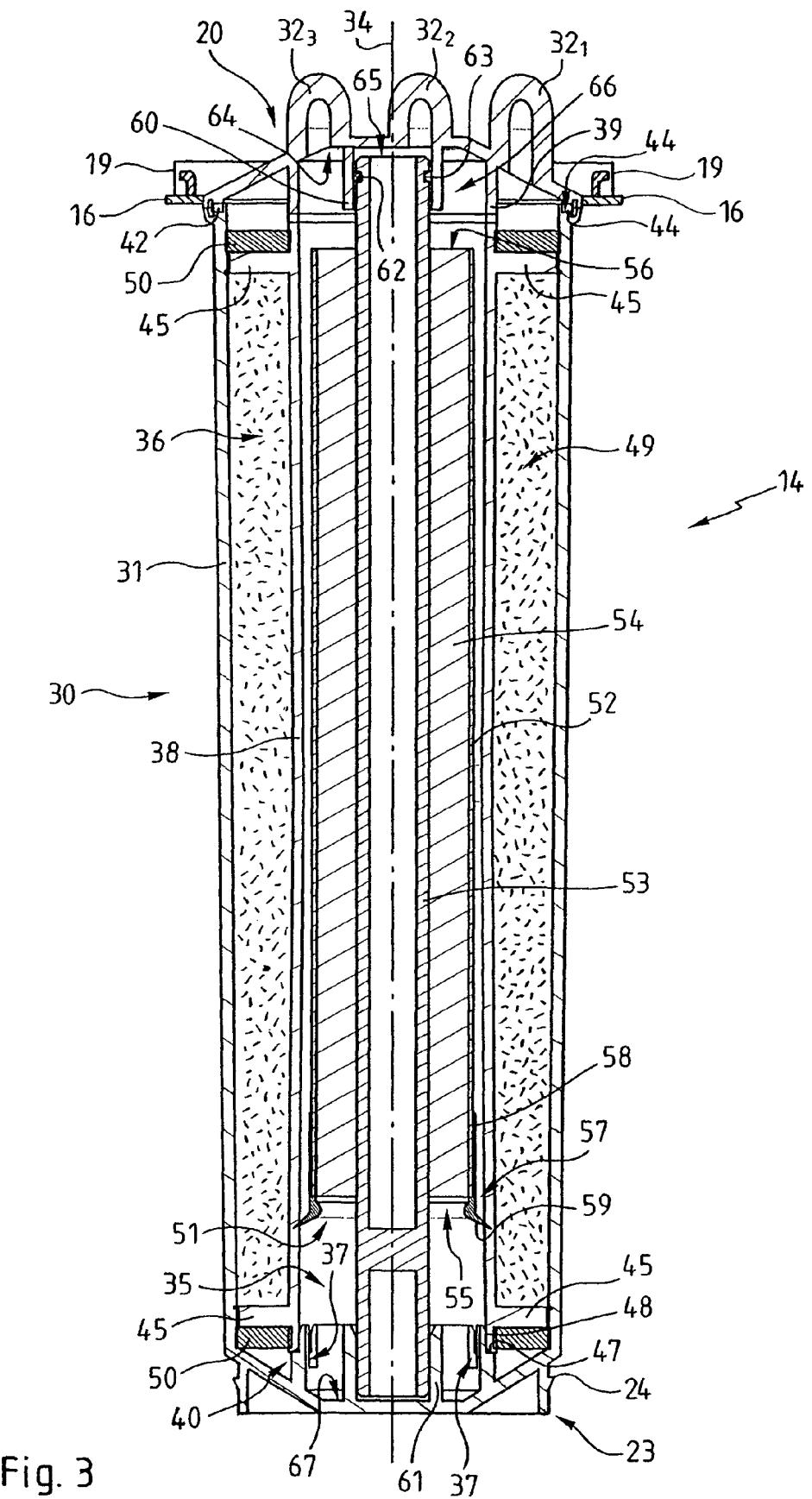
FIG. 3 is a view of the module conforming to the invention to a larger scale and in longitudinal section taken along the line III-III in FIG. 2.

Each head 20 further includes three parallel connectors $32_1$-$32_3$ in each of which there is formed a water inlet or outlet orifice $33_1$-$33_3$ communicating with the interior of the module 14, 15 and extending globally perpendicularly to the axis 34 of the cylindrical wall 31 of the container 30 (see FIGS. 2 and 3). The male connectors of the unit 10 are designed to be nested inside the female connectors $32_1$-$32_3$, and rubber seals (not visible in the figures) seal the male/female connector assemblies.

The modules 14 and 15 as described thus far are identical. In fact, the module 15 shares with the module 14 the same external structure, for reasons of economical manufacture and because the ultrapure water production unit 10 is designed to use an assembly 13 of two modules. On the other hand, the modules differ in terms of their internal structure.

This is because, while the module 15 is filled with a conventional ion exchange resin, and one of its connectors $32_1$-$32_3$ therefore remains unused, the internal structure of the module 14 is unique and original in itself, and is described next with reference to FIGS. 3 to 5.

Figure 4:
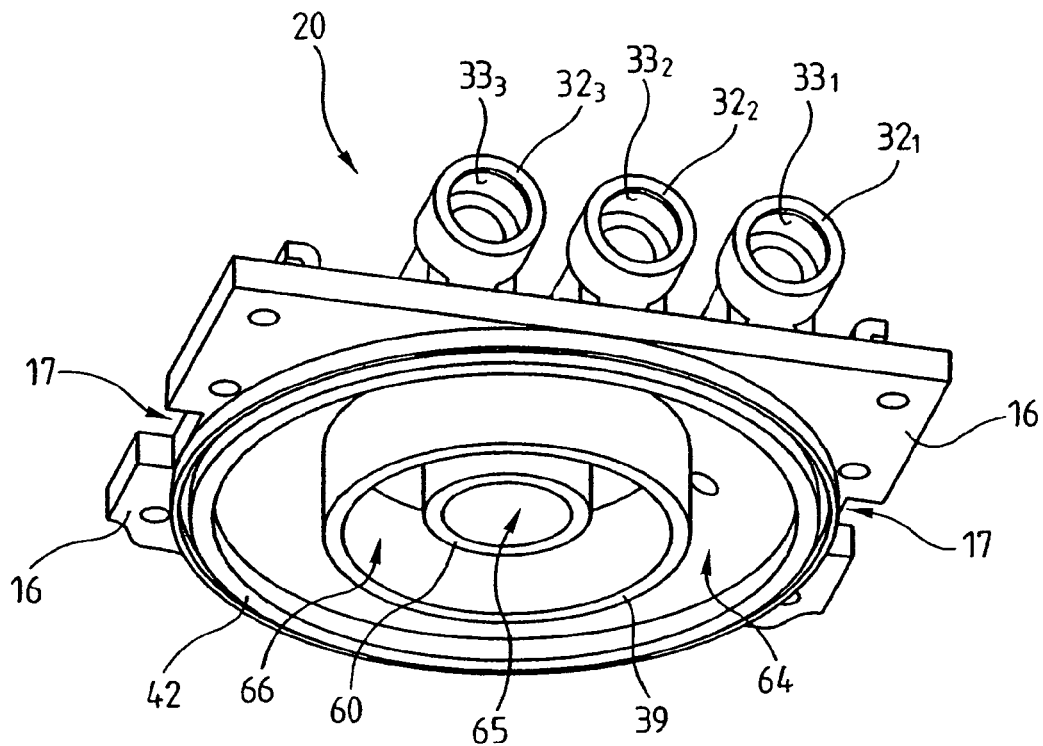
FIG. 4 is a perspective view to a larger scale of the head of the module according to the invention, prior to assembly of the module.
Figure 5:
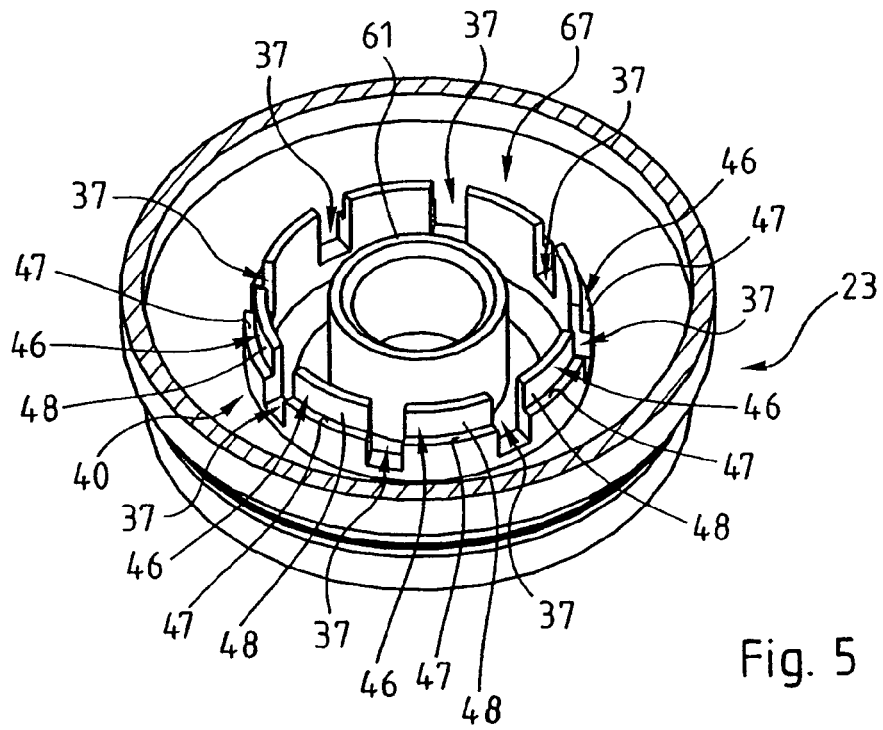
FIG. 5 is a view of the bottom of the module to a larger scale and showing the container of the module in cross section.

In the embodiment shown in FIGS. 3 to 5, the interior of the purified water production module 14 is divided into an internal cylindrical space 35 and an external cylindrical space 36, concentrically surrounding the internal space 35, which communicate with each other via radial passages 37 in the vicinity of the axial end of the container 30 opposite that with the water inlet and outlet orifices $33_1$-$33_3$. This division is to enable separate pretreatment and treatment of water entering the module 14 in the external cylindrical space and in the internal cylindrical space, respectively, and is provided by an internal plastics material cylindrical wall 38 extending a cylindrical skirt 39 projecting from the internal face of the head 20 as far as a crenellated ring 40 which projects from the internal face of the bottom 23 and whose crenellations form the passages 37.

In this regard, it should be noted that the internal cylindrical wall 38 is fixed to the cylindrical skirt 39 of the head 20 by a welding operation to fuse their annular edges, and that the head 20 as such is fixed by fusion welding to the external cylindrical wall 31, as already stated hereinabove, through the intermediary of a ring 42 welded to the upper annular edge 44 of the external cylindrical wall 31.

In the embodiment shown in FIGS. 3 to 5, the perimeter of the internal cylindrical wall 38 also has, in the vicinity of each of its axial ends, centering fingers 45 extending radially as far as the cylindrical wall 31 of the container 30 when the module 14 is assembled. There are six of these centering fingers 45 at each axial end and they are regularly spaced around the perimeter of the cylindrical wall 38.

Clearly the centering fingers 45 contribute in particular to optimal positioning while welding the cylindrical skirt 39 of the head 20 to the internal cylindrical wall 38 of the container 30.

Moreover, the crenellated ring 40 projecting from the bottom 23 includes recesses 46 between the crenellations of the ring 40 and forming the passages 37.

In the embodiment shown in FIGS. 3 to 5, each recess 46 is formed of two orthogonal facets 47 and 48 for positioning the internal cylindrical wall 38 in the vicinity of the bottom 23, one facet (the facet 47) providing an axial abutment for the internal cylindrical wall 38 and the other facet (the facet 48) being operative inside the latter (see FIG. 3).

In accordance with the invention, means for pretreating water entering the module 14, which are known in the art, are housed in the external space 36 of the module 14 and means for treating water that has been pretreated in the external cylindrical space 36, which are also known in the art, are housed in the internal space 35.

As in the embodiment shown in FIGS. 2 to 5, the pretreatment means preferably comprise activated charcoal, here in the form of grains 49.

In practice, a porous disk 50 based on a filter grid made of metal, plastics material or woven or non-woven (cellulose, polypropylene, polyethylene, polyamide, polyester, etc.) fibers is disposed in the vicinity of each axial end of the container 30 between the cylindrical walls 31 and 38 thereof to retain the activated charcoal grains in the external cylindrical space 36 whilst allowing the water to be purified to pass. In the embodiment shown, the disks 50 are tightly fitted to the exterior of the interior cylindrical wall 38 and to the interior of the exterior cylindrical wall 31.

In accordance with the invention, the treatment means generally include a cartridge 51 which is known in the art and is of the kind having at least one selectively permeable membrane for dividing the flow of water which is treated by the pretreatment means, and is caused to flow tangentially to the membrane or membranes, by virtue of permeation through the membrane or membranes due to the action of a pressure gradient, into a flow of permeate or diluate consisting of purified water that has passed through the membrane or membranes and has therefore undergone two purification treatments in the module 14, and a flow of retentate or concentrate consisting of waste water that has not passed through the membrane or membranes.

The treatment means preferably include a reverse osmosis cartridge 51.

Briefly, this kind of reverse osmosis cartridge generally has a membrane structure with one or more films forming a membrane wound in a spiral around a central tube and spacers such as plastics material grids for the feed solution (water to be purified) and the flow of permeate.

The spacers generally provide a support for the film or films and define flow passages allowing water that has entered the cartridge to flow tangentially along the film or films and water that has passed through the films to be collected and fed to the central tube.

In the embodiment shown in FIGS. 3 to 5, the reverse osmosis cartridge 51 is of the kind including a cylindrical enclosure 52 and a hollow perforated central tube 53 concentric therewith. In practice, the central tube 53 is disposed to share the axis 34 of the cylindrical container 30 with the external cylindrical space 36 and the internal cylindrical space 35.

The reverse osmosis cartridge also includes a reverse osmosis treatment membrane structure 54 between the cylindrical enclosure 52 and the central tube 53. The membrane structure 54 communicates with the central tube 53 for the latter to collect the flow of permeate and with the exterior of the cartridge via the annular faces 55 and 56 thereof extending between the cylindrical enclosure 52 and the central tube 53, at each axial end of the cylindrical enclosure 52, respectively to feed the cartridge 51 with water treated by the pretreatment means and for the outflow of retentate.

In the embodiment shown in FIGS. 3 to 5, the reverse osmosis cartridge 51 further includes means 57 for providing a sealed connection between the cylindrical separator wall 38 and the cylindrical enclosure 52 of the cartridge 51, which means are fastened to the cylindrical enclosure 52 and extend around it at the same end as the axial end of the container 30 closed by the bottom 23.

In practice, these connecting means include a sleeve 58 in which the cylindrical enclosure 52 is engaged and which is extended by an annular seal 59 providing the connection to the cylindrical separator wall 38.

Furthermore, the central tube 53 of the reverse osmosis cartridge 51 is closed at the same end as the annular face 55 of the cartridge 51 through which water to be purified enters the cartridge.

In the embodiment shown in FIGS. 2 to 5, the head 20 and the bottom 23 of the container 30 each further include a central bush 60, 61 in which is housed an axial end section of the central tube 53.

An O-ring 62 housed in a groove 63 in the central tube 53 is furthermore disposed between the latter and the central bush 60 of the head 20 to seal this assembly.

Accordingly, the portion of the internal cylindrical space 35 extending between the annular face 56 of the reverse osmosis cartridge 51 and the internal face 64 of the head 20 is divided into two separate free sub-spaces that are concentric and communicate separately with a respective orifice of the head 20.

To be more precise, the free sub-space 65 delimited by the bush 60 communicates with the orifice $33_2$ of the connector $32_2$ to evacuate from the module 14 the flow of permeate collected by the central tube 53 and consisting of water purified by the pretreatment means (activated charcoal grains 49) and the reverse osmosis cartridge 51, whereas the annular free sub-space 66 extending around the bush 60 communicates with the orifice $33_3$ of the connector $32_3$ to evacuate from the module 14 the flow of retentate produced by the reverse osmosis cartridge 51 and consisting of waste water.

At the same axial end of the container 30, the external cylindrical space 36 communicates with the orifice $33_1$ of the connector $32_1$ to feed water to be purified to the pretreatment means consisting of the activated charcoal grains 49.

At the other axial end of the container 30, and through the passages 37, water treated by the pretreatment means enters the portion of the free internal cylindrical space 45 extending between the annular face 55 of the reverse osmosis cartridge 51 and the internal face 67 of the bottom 23 to feed the reverse osmosis cartridge 51 with water to be purified through the annular face 55 thereof.

In the preferred embodiment shown in FIGS. 6 to 9, the same reference numbers are generally retained, but with a "prime" suffix.

Figure 6:
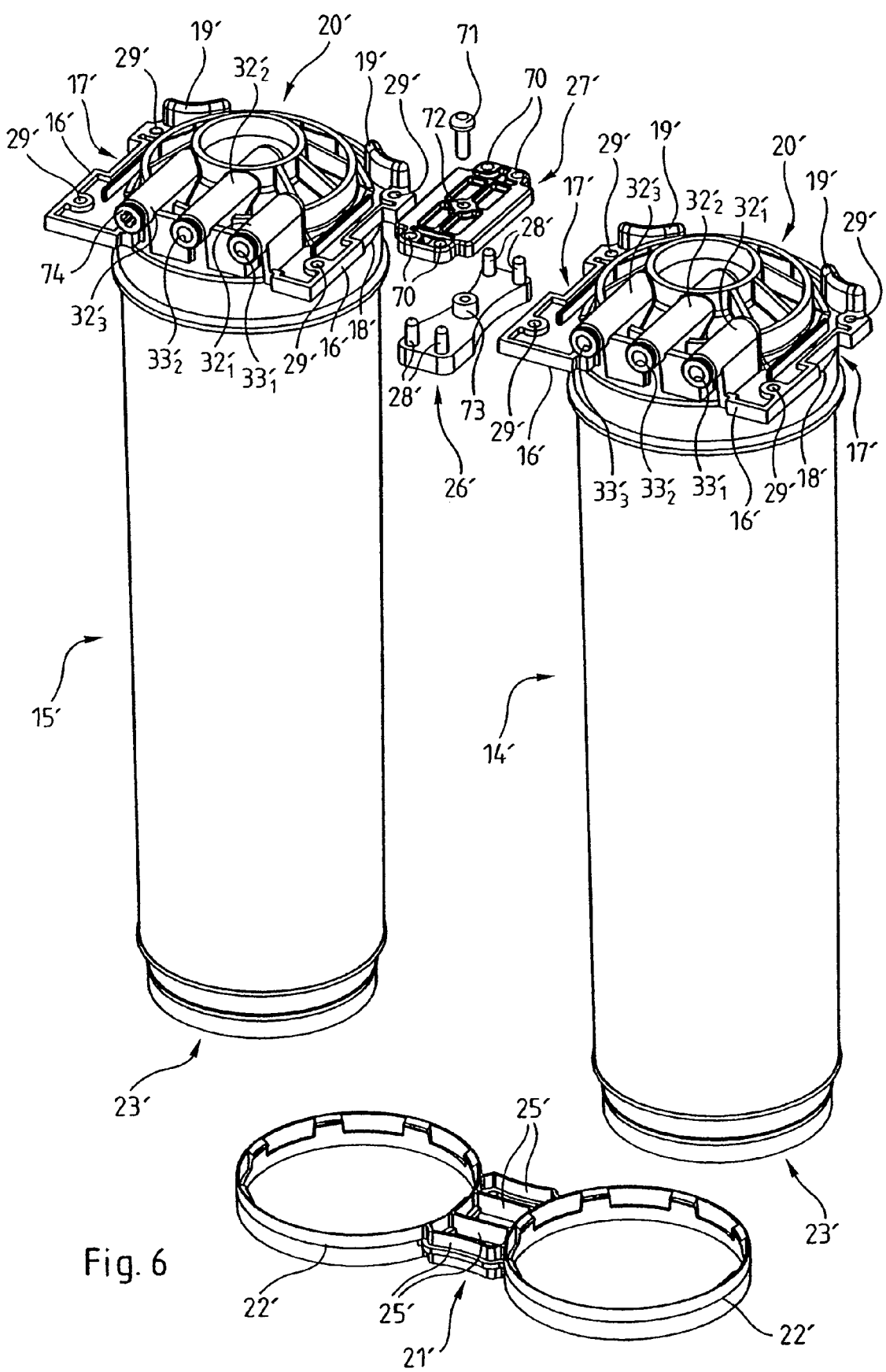
FIGS. 6 to 9 are views similar to FIGS. 2 to 5, respectively, and represent an assembly of two water treatment modules conforming to a preferred embodiment of the invention.

The modules 14' and 15' shown in FIG. 6 are coupled by a base 21' with a figure-of-eight configuration which comprises two rings 22' having an internal conformation enabling them to be removably clipped to one of the bottoms 23' of the modules 14' and 15', each of which is provided with a flange 24' for this purpose. The two rings 22' are connected by small bridges 25' molded in one piece with the rings 22' from a plastics material.

The modules 14' and 15' are coupled together at the same end as their head 20' by two connecting strips 26' and 27'. The strip 26' is provided with studs 28' by means of which the modules 14' and 15' can be coupled together side by side thanks to holes 29' through their lateral extensions 16' adapted to receive the studs 28'.

The ends of the studs 28' that in the assembled state project beyond the through-holes 29' enter holes 70 in the strip 27'. A pin 71 passing through a central hole 72 in the strip 27' and designed to cooperate with a boss 73 projecting from the strip 26' attaches the latter and the strip 27' together. As an alternative to this, the pin 71 can be replaced by a screw cooperating with a threaded boss.

In the embodiment shown in FIGS. 6 to 9, each purified water production module 14', 15' includes a container 30' having a cylindrical wall 31' closed at a first axial end by the head 20' for connecting the module 14', 15' to a water purification unit similar to the unit 10 and at its second axial end by the bottom 23'.

The head 20' is permanently fixed to the cylindrical wall 31' by a welding operation to fuse their annular edges and the bottom 23' is molded in one piece with the cylindrical wall 31' from a plastics material. This produces a monolithic container intended to form a disposable module 14', 15'.

Figure 7:
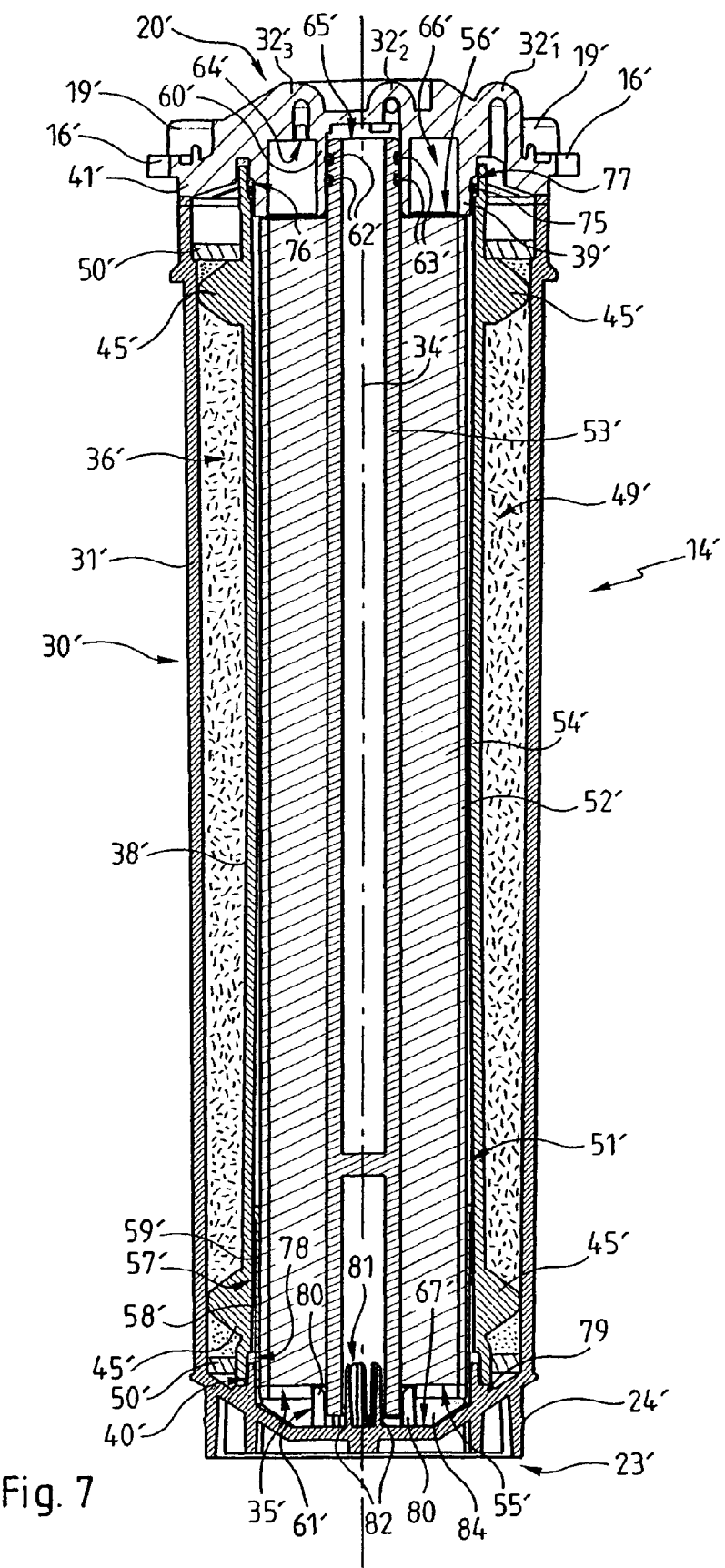

In the preferred embodiment, each head 20' includes three parallel male connectors $32'_1$-$32'_3$, in each of which is formed a water inlet or outlet orifice $33'_1$-$33'_3$ which communicates with the interior of the module 14', 15', and which extend globally perpendicularly to the axis 34' of the cylindrical wall 31' of the container 30' (see FIGS. 6 and 7). The male connectors are intended to be nested inside female connectors of the water purification unit, rubber seals (which cannot be seen in the figures) sealing the male and female connector assemblies.

The modules 14' and 15' also have recesses 17' in their lateral extensions bordered by bevels 18' and projections 19' forming bearing surfaces for the user's thumbs.

In the preferred embodiment, the module 15' is also filled with a conventional ion exchange resin and its connector $33'_3$ is therefore shut off by a plug 74. As an alternative to this, the connector $33'_3$ can be blocked off directly by the molding process.

Figure 8:
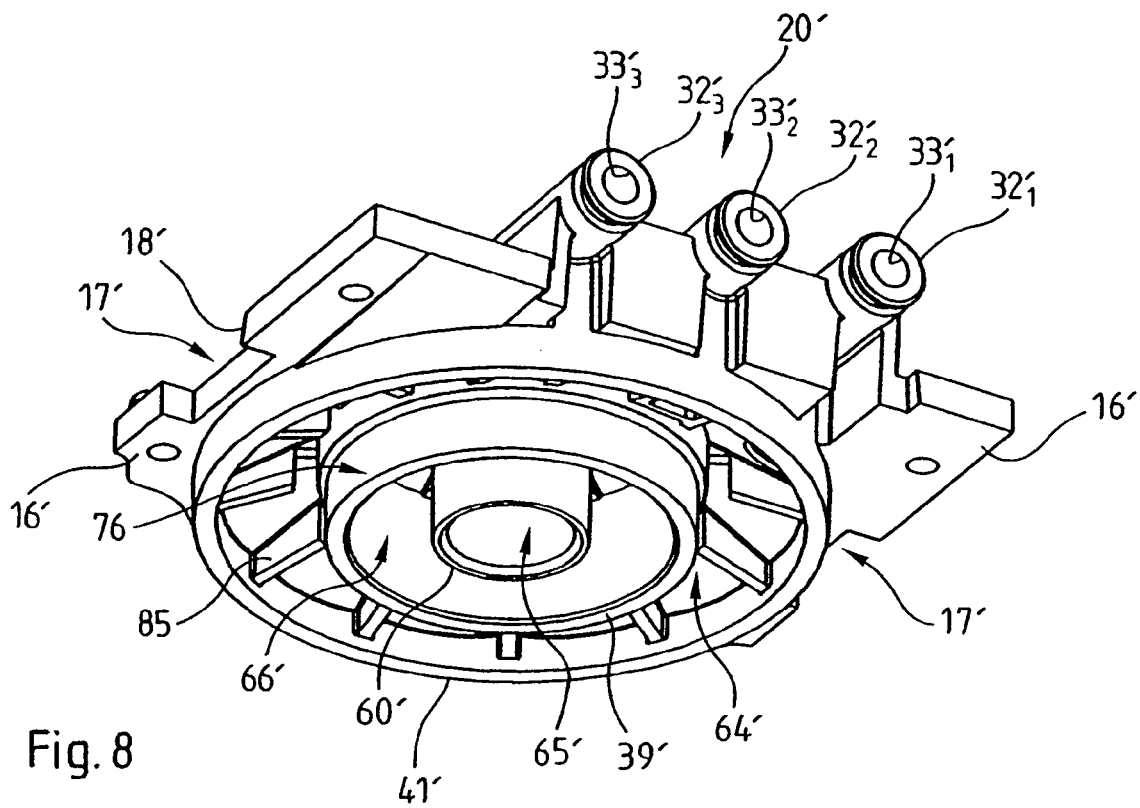
Figure 9:
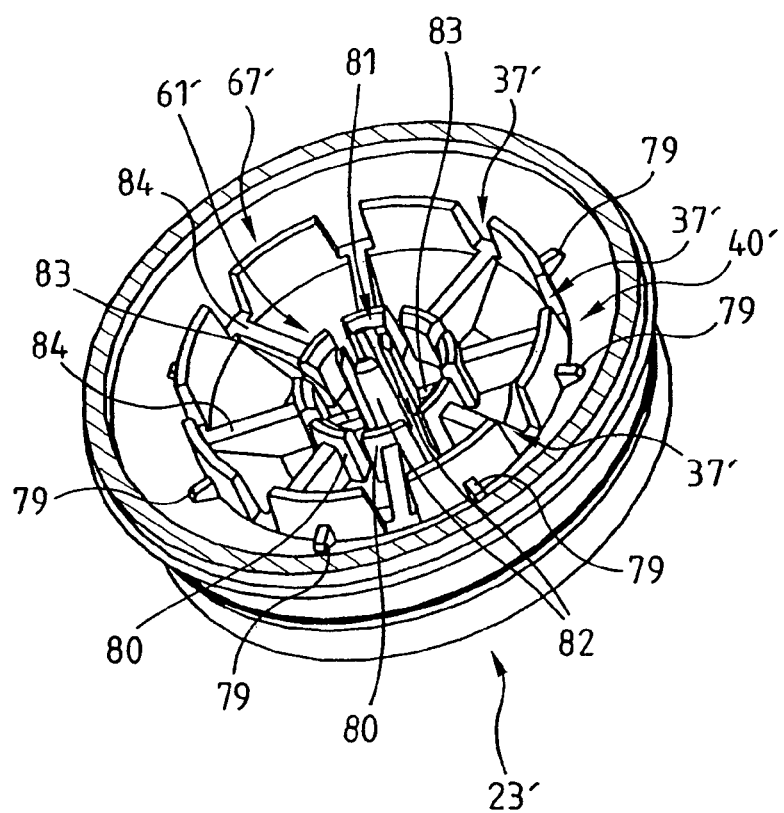

In the embodiment shown in FIGS. 7 to 9, the interior of the purified water production module 14' is divided into an internal cylindrical space 35' and an external cylindrical space 36' which are concentric and communicate with each other via radial passages 37' in the vicinity of the axial end of the container 30' opposite that with the water inlet and outlet orifices $33'_1$-$33'_3$. This division is intended to allow separate pretreatment and treatment of water entering the module 14' in the external cylindrical space and the internal cylindrical space, respectively, and is provided by a concave plastics material internal cylindrical wall 38', a cylindrical skirt 39' projecting from the internal face of the head 20', and a crenellated ring 40' projecting from the internal face of the bottom 23' and whose crenellations form the passages 37'. The skirt 39' and the ring 40' provide continuity of separation from a corresponding longitudinal end of the cylindrical wall 38' to the head 20' and to the bottom 23', respectively.

In this regard, it must be noted that the internal cylindrical wall 38' and the cylindrical skirt 39' of the head 20' are housed concentrically one inside the other with a seal 75 between them, whereas the head 20' as such is fixed by fusion welding to the external cylindrical wall 31', as mentioned hereinabove, except that only one ring 41' is used for this.

The cylindrical skirt 39' also has an annular recess 76 forming with a facing annular recess 77 of the cylindrical wall 38' an annular housing for the seal 75.

In the embodiment shown in FIGS. 7 to 9, the perimeter of the internal cylindrical wall 38' has in the vicinity of each of its axial ends six centering fingers 45' which extend radially as far as the cylindrical wall 31' of the container 30' when the module 14' is assembled.

Moreover, the crenellated ring 40' and the axial end of the cylindrical wall 38' at the same end as the second axial end of the container 30' are housed concentrically one inside the other.

To this end, the cylindrical wall 38' has an annular recess 78 by means of which the crenellated ring 40' is nested inside the cylindrical wall 38'. To hold the cylindrical wall 38' at an axial distance from the internal face 67' of the bottom 23', in order to allow water to pass from the external cylindrical space 36' to the internal cylindrical space 35' via the crenellations 37' of the crenellated ring 40', a plurality of locating patterns 79 project from the internal face 67' of the bottom 23' and extend radially away from the crenellated ring 40'.

The pretreatment means housed in the external space 36' again consist of activated charcoal in the form of grains 49'.

In the vicinity of each axial end of the container 30' there is a porous disk 50' disposed between the cylindrical walls 31' and 38' thereof to retain the grains of activated charcoal in the external cylindrical space 36' whilst allowing the water to be purified to pass.

The treatment means shown in FIG. 7 include a reverse osmosis cartridge 51' known in the art and adapted to divide the flow of water treated by the pretreatment means into a flow of permeate consisting of water purified by the activated charcoal grains 49' and the reverse osmosis cartridge 51' and a flow of retentate consisting of waste water.

Reverse osmosis cartridges of the kind shown in FIGS. 3 and 7 are sold by the American companies Dow Chemical Corporation (FilmTec® models from the TW30 range) and Fluid Systems, for example.

Thus the reverse osmosis cartridge 51' includes a cylindrical enclosure 52' and a hollow perforated central tube 53' which are concentric with each other. The tube is disposed so that it shares the axis 34' of the cylindrical container 30' with the external cylindrical space 36' and the internal cylindrical space 35'.

The reverse osmosis cartridge includes a reverse osmosis treatment membrane structure 54' between the cylindrical enclosure 52' and the central tube 53'. The membrane structure 54' communicates with the central tube 53', so that the latter can collect the flow of permeate, and with the exterior of the cartridge via the annular faces 55' and 56' thereof extending between the cylindrical enclosure 52' and the central tube 53', at each of the axial ends of the cylindrical enclosure 52', respectively to feed the cartridge 51' with water treated by the pretreatment means and for the outflow of retentate.

In the embodiment shown, the reverse osmosis cartridge 51' includes means 57' for providing a sealed connection between the cylindrical separator wall 38' and the cylindrical enclosure 52' of the cartridge 51', which means are fastened to the cylindrical enclosure 52' and extend around the latter at the same end as the axial end of the container 30' closed by the bottom 23'.

In practice, the connecting means include a sleeve 58' in which the cylindrical enclosure 52' is engaged and which has at its distal end (relative to the annular face 55') an increased thickness forming an annular seal 59' between the enclosure 52' and the cylindrical wall 38'.

The central tube 53' of the reverse osmosis cartridge 51' is closed at the same end as the annular face 55' of the cartridge 51' through which water to be purified enters the cartridge.

In the embodiment shown in FIGS. 7 to 9, the head 20' and the bottom 23' of the container 30' each include a central bush 60', 61' housing an axial end section of the central tube 53'.

Two O-rings 62' housed in respective grooves 63' in the central tube 53' are disposed between the latter and the central bush 60' of the head 20' to seal the assembly. As an alternative to this, using only one O-ring can be envisaged.

At the opposite axial end, the bush 61' is formed of a plurality of circular arc-shaped segments 80 regularly spaced around the axis 34' and concentrically surrounding a central truncated cone 81 for locating the cartridge 51', which is operative inside the central tube 53' of the latter. The truncated cone 81 is formed of four columns 82 regularly spaced around the axis 34' and slightly higher than the segments 80.

When the module 14' is assembled, the central tube 53' is therefore gripped in the annular space between the central truncated cone 81 and the bush 61' that surrounds it and the lower end of the enclosure 52' surrounded by the sleeve 58' is housed concentrically in the crenellated ring 40', and the upper end of the latter abuts against the annular edge of the cylindrical skirt 39' of the head 20'. Moreover, the lower annular edge of the central tube 53' rests on radial ribs 83 projecting from the internal face 67' of the bottom 23' and connecting the columns 82 to respective radially adjacent segments 80. Other radial ribs 84 that also project from the bottom 23' further connect the external faces of the segments 80 facing toward the crenellated ring 40' to the internal face 67' of the bottom 23'.

It will be noted that radial ribs 85 also project from the internal face 64' of the head 20', some of them serving as radial abutments for the upper end of the cylindrical wall 38'.

It will finally be noted that, just like the bush 61 of the embodiment shown in FIGS. 2 to 5 and the columns 83, the bushes 60' and 61' are beveled to facilitate fitting the central tube 53'.

Accordingly, the portion of the internal cylindrical space 35' between the annular face 56' of the reverse osmosis cartridge 51' and the internal face 64' of the head 20' is divided into two separate free sub-spaces which are concentric and which communicate separately with a respective orifice of the head 20'.

To be more precise, the free sub-space 65' delimited by the bush 60' communicates with the orifice $33'_2$ of the connector $32'_2$ to evacuate from the module 14' the flow of permeate collected by the central tube 53' and consisting of water purified by the pretreatment means (activated charcoal grains 49') and the reverse osmosis cartridge 51', and the annular free sub-space 66' around the bush 60' communicates with the orifice $33'_3$ of the connector $32'_3$ to evacuate from the module 14' the flow of retentate produced by the reverse osmosis cartridge 51' and consisting of waste water.

At the same axial end of the container 30', the external cylindrical space 36' communicates with the orifice $33'_1$ of the connector $32'_1$ to feed water to be purified to the pretreatment means consisting of the activated charcoal grains 49'.

At the other axial end of the container 30', water treated by the pretreatment means penetrates through the passages 37' into the portion of the free internal cylindrical space 35' between the annular face 55' of the reverse osmosis cartridge 51' and the internal face 67' of the bottom 23' to feed the reverse osmosis cartridge 51' with water to be purified via its annular face 55'.

Of course, the present invention is not limited to the embodiment described and shown, but encompasses any variant execution thereof.

For example, a different type of reverse osmosis cartridge can be used, in particular a membrane cartridge formed of hollow fibers.

It must also be noted that the sealed connecting means of the cartridge can be either an integral part of the cartridge available off the shelf or fixed to an existing cartridge when the module is assembled.

The invention claimed is:

1. A module for purifying a fluid, comprising a cylindrical container provided at a first of its axial ends with a head having fluid inlet and outlet orifices communicating with the interior of the module and having a cylindrical skirt projecting axially therefrom, and at a second of its axial ends with a bottom comprising a crenellated ring projecting axially therefrom, in which are housed pretreatment means for carrying out a first operation of purifying the fluid and treatment means for carrying out a second operation of purifying the fluid after the latter has been treated by the pretreatment means, wherein said container is monolithic to form a disposable module and the interior thereof is divided by separator means into an external cylindrical space and an internal cylindrical space, said separator means extending from said cylindrical skirt to said crenellated ring, said external cylindrical space and said internal cylindrical space communicating with each other via one or more passages defined by the crenellations in said crenellated ring, the treatment means include a cartridge including one or more selectively permeable membranes for dividing, by virtue of permeation through the membrane or membranes due to the action of a pressure gradient, the flow of fluid that has undergone the first purification operation and caused to flow tangentially to the membrane or membranes into a flow of permeate consisting of purified fluid that has passed through the membrane and therefore undergone two purification operations and a flow of retentate consisting of residual fluid that has not passed through the membrane or membranes, the pretreatment means and the cartridge are housed in the external cylindrical space and the internal cylindrical space, respectively, the external cylindrical space communicates, at the same end as the first axial end of the container, with a first orifice for feeding fluid to be purified to the pretreatment means, and the internal cylindrical space communicates separately, at the same end as the first axial end of the container, with a second orifice for evacuating from the module the flow of permeate and with a third orifice for evacuating from the module the flow of retentate, wherein said cartridge comprises (i) a cylindrical enclosure and, concentric therewith, a hollow, perforated, central innermost tube of said cylindrical container in which said cartridge is contained, said central innermost tube sharing the axis of said cylindrical container with said external cylindrical space and said internal cylindrical space, (ii) one or more selectively permeable reverse osmosis treatment membranes between said cylindrical enclosure and said central innermost tube and communicating with said central innermost tube for collection by the latter of the flow of permeate and with the exterior of said cartridge via the annular faces thereof between the cylindrical enclosure and said central innermost tube at each axial end of said cylindrical enclosure, respectively to feed said cartridge with fluid treated by said pretreatment means and for the outflow of retentate.

2. A module according to claim 1, wherein said cartridge is a reverse osmosis, nanofiltration or ultrafiltration cartridge.

3. A module according to claim 1, further comprising means for providing a sealed connection between the separator means and the cylindrical enclosure of said cartridge, said means being attached to the cylindrical enclosure and extending around the cylindrical enclosure.

4. A module according to claim 1, wherein said pretreatment means are chosen from the group consisting of activated charcoal, polyphosphates and frontal filtration elements.

5. A module according to claim 1, wherein said container includes a cylindrical wall closed at the first axial end by said head for connecting the module to a fluid purification unit and including three parallel connectors in each of which is formed one of the three orifices and the cylindrical wall is closed at the second axial end by said bottom, wherein said head and said bottom are non-removable.

6. A module according to claim 5, wherein said connectors extend globally perpendicularly to the axis of the cylindrical wall of the container.

7. A module according to claim 5 or claim 6, wherein said skirt and said ring provide continuity of separation from a corresponding longitudinal end of the cylindrical wall to the head and to the bottom, respectively.

8. A module according to claim 7, wherein said head is fixed to the cylindrical wall of the container by gluing, rotation welding, ultrasound welding or fusion welding their annular edges.

9. A module according to claim 7, wherein said cylindrical skirt of the head and the axial end of the cylindrical wall of the separator means at the same end as the first axial end of the container are either fixed together by gluing, rotation welding, ultrasound welding or fusion welding their annular edges or housed concentrically with one inside the other with a seal between them.

10. A module according to claim 9, wherein said skirt of the head and the cylindrical wall of the separator means each have an annular recess forming with the opposite recess an annular housing for the seal.

11. A module according to claim 7, wherein said ring of the bottom and the axial end of the cylindrical wall of the separator means at the same end as the second axial end of the container are housed concentrically one inside the other.

12. A module according to claim 1, wherein the bottom of the container includes locating means for holding the cylindrical wall of the separator means at an axial distance from the internal face of the bottom to allow fluid to flow from the external cylindrical space to the internal cylindrical space via the crenellations of the crenellated ring.

13. A module according to claim 12, wherein said crenellated ring includes recesses between the crenellations and forming axial abutments serving as locating means for the cylindrical wall of the separator means.

14. A module according to claim 13, wherein said locating means take the form of patterns projecting from the internal face of the bottom of the container.

15. A module according to claim 7, wherein the perimeter of the cylindrical wall of the separator means has in the vicinity of each axial end of the cylindrical wall centering fingers extending radially as far as the cylindrical wall of the container and serving to place the axis of the cylindrical wall on the axis of the container.

16. A module according to claim 5, wherein said head and the bottom of the container include a nesting retainer for the cartridge.

17. A module according to claim 16, wherein said head and the bottom each include a bush housing a respective axial end portion of the central tube and one or more seals are disposed between the latter and the central bush of the head, the latter bush communicating with the second orifice.

18. A module according to claim 17, wherein said seal or each seal is housed in a groove formed in the central tube.

19. A module according to claim 17 or claim 18, further comprising a central truncated cone for positioning the cartridge, operative inside the central tube of the latter, and projecting from the internal face of the bottom of the container, concentrically with the bush of the bottom and over a length greater than that of the bush.

20. A module according to claim 7, further comprising a perforated or porous disk in the vicinity of each axial end of the container and between the cylindrical walls of the latter to retain the pretreatment means in the external cylindrical space whilst allowing the fluid to be purified to pass.

21. A module according to claim 2, wherein said central innermost tube is closed at the same end as the annular face of said cartridge through which the fluid enters the cartridge.

* * * * *